Figure 1:
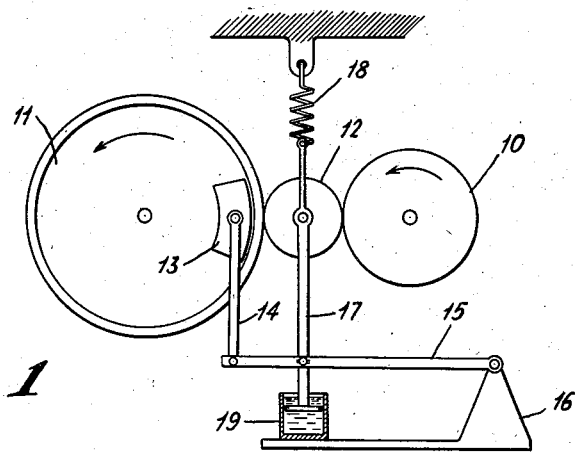

Sept. 14, 1937.  E. W. KELLOGG  2,092,883
DRIVE SYSTEM
Filed Feb. 18, 1935

INVENTOR
EDWARD W. KELLOGG
BY
ATTORNEY

Patented Sept. 14, 1937

2,092,883

UNITED STATES PATENT OFFICE 2,092,883

DRIVE SYSTEM

Edward W. Kellogg, Moorestown, N. J., assignor to Radio Corporation of America, a corporation of Delaware Application February 18, 1935, Serial No. 7,059

5 Claims. (Cl. 74—411)

This invention relates to drive systems suitable for the operation of phonographs, sound picture recorders and reproducers and other types of apparatus which are required to function at a substantially constant speed. It has for its principal object the provision of an improved constant speed drive system wherein the driving, damping and other applied forces are so balanced with respect to one another as to enable the driven member to be operated uniformly and in synchronism with associated apparatus.

There have been provided in the past various types of drive systems including mechanical filters wherein a continuous brake load is applied to the driven element and the driving torque is applied through a spring. The primary purpose of this brake load has been to provide damping for preventing hunting or oscillation of the drive system at its natural vibration frequency. It may also provide a desirable mechanical impedance to resist speed fluctuations especially in cases where the moment of inertia is inadequate. If the moment of inertia is low, the filtering system, of course, becomes equivalent to an electrical filter having only capacity and resistance.

A practical difficulty encountered in the use of mechanical filters employing a continuous braking action is that the deflection of the driving spring tends to become uncertain and is likely to be different under starting and running conditions thus making it impossible to maintain the driven element in exact synchronism with associated apparatus. A possible solution of this difficulty is disclosed in my copending application Serial No. 704,725, filed December 30, 1933, which matured into Patent Number 2,050,613, for a clutch or brake mechanism operable to deliver to the driven member a torque which is substantially constant irrespective of variations in the primary torque applied to the drive system. In accordance with the present invention, the aforementioned difficulty is avoided by applying to a member flexibly supported between the driving and driven members a force which is derived from a brake or damping element cooperating with the driven member and which acts against the forces tending to move the flexibly supported intermediate member from its neutral position.

Figure 2:
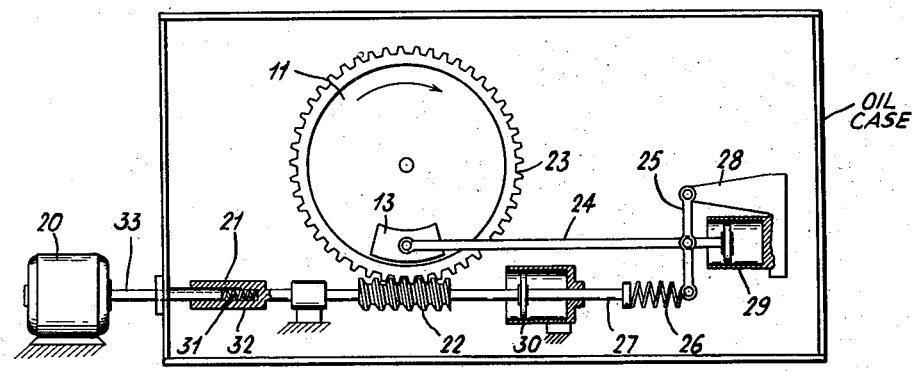
Figure 3:
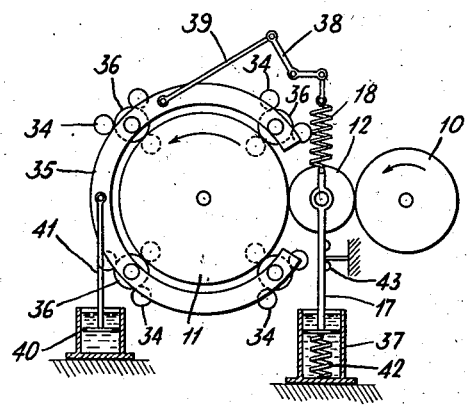

The invention will be better understood from the following description when considered in connection with the drawing, and its scope will be pointed out in the appended claims:

Referring to the drawing:

Fig. 1 illustrates a system wherein a pinion is flexibly supported between the driving and driven members, Fig. 2 illustrates the application of the invention to a worm gear drive system, and Fig. 3 illustrates a modification of the arrangement of Fig. 1.

The arrangement of Fig. 1 includes a driving member 10 which is geared to a driven member 11 through an intermediate pinion 12. Damping of the driven member 11 is effected by a viscous brake member 13 supported on an arm 14 pivoted at its lower end to a lever 15 which is pivoted at its left hand end to a stationary support 16 and at a point intermediate its ends to the support 17 of the pinion 12. It will be observed that the support 17 is itself supported through a spring 18 and is provided at its lower end with a dash pot 19.

With the arrangement just described the pinion 12 is evidently free to move a limited distance tangentially against the resilient force of the spring 18. If there are speed fluctuations in the driving systems or imperfection in the driving gears the pinion moves back and forth and tends to transmit a constant torque. If the load on the driven member increases the pinion will tend to move downwardly. If a viscous damping or braking force is applied to the driven member 11 to produce mechanical impedance or provide damping this brake will presumably constitute the principal load. Variations in friction due, for example, to change in viscosity of the brake lubricant with temperature would cause the brake load to change. It should be noted that the brake shoe 13 is connected to the movable pinion 12 through levers 14, 15 and 17 in such a way that the force reacted on the brake shoe neutralizes the tendency of the drag on the driven member to move the pinion from its neutral position. Since the force tending to displace the axis of the pinion is twice that exerted at the periphery of the driven gear the linkage through which the brake shoe and movable pinion are connected must be designed to take into account this factor and also the radius at which the brake shoe acts. It is desirable, of course, that the brake shoe be light in order to avoid impairing the filtering action. The dash pot 19 shown as connected to the movable idler or pinion 12 is desirable but not an essential feature of the system. It will be understood that a spring similar to the spring 18 may be inserted in the coupling between the idler 12 and the intermediate pivot point of the lever 15.

The arrangement of Fig. 2 includes a motor 20 which is coupled to the driven member 11 through a coupling 21, a worm gear 22 and a cooperating gear 23. Arranged to cooperate with the driven member 11 is a viscous brake 13 which is coupled to the worm gear 22 through levers 24 and 25, a spring 26 and a worm gear shaft 27. The lever 25 is pivoted to a stationary support 28. The lever 24 is pivoted to a point intermediate the ends of the lever 25 and is provided at its end with a dash pot 29. A dash pot 30 is provided in connection with a bearing of the shaft 27. The coupling 21 includes a spring 31 mounted in a collar 32 which is fixed to the shaft 27. A shaft 33 of the motor 20 is splined into the collar 32 thus permitting the worm gear 22 to move axially against the action of the spring 31. The connection of the brake shoe 13 to the spring 26 is such that a change in brake load causes an axial movement of the shaft 27 thus changing the spring compression and applying a force which offsets the change in force exerted through the gear teeth. The mean working position of the worm is therefore unaltered. The gears 22 and 23 and their associated parts may be mounted in a container containing oil or other suitable lubricating material.

The arrangement in Fig. 3 is similar to that of Fig. 1 in that a flexibly supported pinion 12 is interposed between the driving member 10 and the driven member 11. In this modification of the invention, however, there are associated with the driven member 11 a plurality of governors 34 of the usual phonograph type mounted on a ring 35 and coupled to the driven member 11 through rollers 36. It will be noted that the support 17 of the pinion 12 is provided at its lower end with a dash pot 37 and is coupled through a crank arm 38 and lever 39 to the ring 35. A dash pot 40 is coupled to the ring through rod 41.

As will be readily understood, the load of the governors 34 will cause the ring to rotate and thereby stretch the spring 18 sufficiently to exert on the pinion 12 a force equal to the reaction of the governor load on the axis of the pinion. The pinion therefore, tends to remain in a fixed position which is determined by a spring 42 associated with the dash pot 37. The purpose of the governors in holding the speed constant would be defeated if the governor ring could move with appreciable rapidity. The dash pot 40 prevents this. Stops 43 are arranged to limit the movement of the pinion. When operation of the apparatus is initiated the position of the pinion is limited by one of the stops. When the governor brakes take hold the ring will slowly move in the direction of rotation of the main gear thereby stretching spring 18 and tending to bring the pinion back to its normal position.

Having thus described my invention, I claim:

1. The combination of a driven member, a worm resiliently supported for axial movement and arranged to drive said member, damping means associated with said driven member, and means for applying the reaction force of said damping means to said worm for restoring said worm to its neutral position.

2. The combination of a driven member, a worm resiliently supported for axial movement and arranged to drive said member, damping means associated with said driven member, a linkage for applying the reaction force of said damping means to said worm, and means for damping the movement of said linkage.

3. The combination of a driven member, a worm resiliently supported for axial movement and arranged to drive said member, damping means associated with said driven member, a linkage for applying the reaction force of said damping means to said worm, and means for damping the axial movement of said worm.

4. In combination a driving member, a driven member, a coupling member interposed between said members, means flexibly supporting said coupling member, a damping member in frictional cooperative relation with said driven member whereby it is urged in the direction of motion of the said driven member, and means connecting said damping member and said supporting means whereby said damping member and said coupling member are maintained in equilibrium during operation.

5. In combination a driving member, a driven member, a coupling member interposed between said members, a friction member in cooperative relation with said driven member, and adapted to be urged in the direction of movement thereof, means yieldably supporting said friction member, damping means connected to said supporting means and means connecting said supporting means to said coupling member, whereby the force produced by the friction of said friction member against said driven member is balanced against the force tending to move said coupling member.

EDWARD W. KELLOGG.